(12) United States Patent
Franceschi et al.

(10) Patent No.: US 9,776,752 B2
(45) Date of Patent: Oct. 3, 2017

(54) APPARATUS AND METHOD FOR FEEDING EMPTY CAPSULES TO A PACKAGING MACHINE

(71) Applicant: GIMA S.P.A., Zola Predosa (IT)

(72) Inventors: Fabio Franceschi, Mordano (IT); Dario Rea, Monterenzio (IT)

(73) Assignee: GIMA S.P.A., Zola Predosa (BO) (IT)

( * ) Notice: Subject to any disclaimer, the term of this patent is extended or adjusted under 35 U.S.C. 154(b) by 0 days.

(21) Appl. No.: 14/432,226

(22) PCT Filed: Oct. 29, 2013

(86) PCT No.: PCT/EP2013/072554
§ 371 (c)(1),
(2) Date: Mar. 30, 2015

(87) PCT Pub. No.: WO2014/067918
PCT Pub. Date: May 8, 2014

(65) Prior Publication Data
US 2015/0266602 A1    Sep. 24, 2015

(30) Foreign Application Priority Data
Oct. 31, 2012  (IT) .............................. BO2012A0594

(51) Int. Cl.
*B65B 29/02*       (2006.01)
*B65B 43/46*       (2006.01)
(Continued)

(52) U.S. Cl.
CPC .............. *B65B 43/52* (2013.01); *B65B 29/02* (2013.01); *B65B 43/44* (2013.01); *B65B 43/46* (2013.01);
(Continued)

(58) Field of Classification Search
CPC ......... B65B 29/02; B65B 43/44; B65B 43/46; B65B 61/065; B65B 43/52; B65G 47/06; B65G 47/90
See application file for complete search history.

(56) References Cited

U.S. PATENT DOCUMENTS 3,275,189 A * 9/1966 Goldsborough ........ B65B 43/44
221/211
3,391,827 A * 7/1968 Govatsos .................. A47F 1/04
221/172
(Continued)

FOREIGN PATENT DOCUMENTS

EP    0316247 A2 * 5/1989 ............. B65B 43/44
FR    2687368 A1 * 8/1993 ............. B65B 43/44
(Continued)

*Primary Examiner* — James Ference
*Assistant Examiner* — Charissa Ahmad

(57) ABSTRACT

A feeding apparatus for feeding single empty capsules to a packaging machines includes a magazine (11) adapted to house a stack (12) of trays (13) including a plurality of empty capsules; a drawing and moving device (14) adapted to draw from the stack (12), and move, a tray (13); a separation device adapted to receive the tray (13) from the drawing and moving device (14) and to obtain single empty capsules; and a transfer system (16) adapted to transfer the empty capsules from the separation device to a transport system of the packaging machine.

13 Claims, 5 Drawing Sheets

(51) Int. Cl.
*B65B 43/52* (2006.01)
*B65B 43/44* (2006.01)
*B65B 61/06* (2006.01)
*B65G 47/06* (2006.01)
*B65G 47/90* (2006.01)

(52) U.S. Cl.
CPC ............ *B65B 61/065* (2013.01); *B65G 47/06* (2013.01); *B65G 47/90* (2013.01); *B65G 2201/02* (2013.01)

(56) References Cited

U.S. PATENT DOCUMENTS

| | | | | |
|---|---|---|---|---|
| 3,574,291 | A | * | 4/1971 | Rosendahl ............ B65B 61/065 221/71 |
| 3,580,442 | A | * | 5/1971 | Rohdin ................... B65B 43/46 198/458 |
| 4,176,507 | A | * | 12/1979 | Mancini ................ B65B 7/2878 53/282 |
| 4,327,826 | A | * | 5/1982 | Wilson .................... B65B 43/44 198/468.1 |
| 4,776,146 | A | * | 10/1988 | Whitehouse ........... B65B 5/101 53/250 |
| 5,081,819 | A | * | 1/1992 | Cloud .................... B65B 1/366 425/373 |
| 5,133,169 | A | * | 7/1992 | Tesch, Jr. ................ B65B 5/068 53/247 |
| 5,649,412 | A | * | 7/1997 | Binacchi ................. B65B 9/023 426/77 |
| 6,440,256 | B1 | * | 8/2002 | Gordon .................... A47J 31/08 156/201 |
| 6,751,927 | B2 | * | 6/2004 | Battisti ................... B65B 9/045 53/131.5 |
| 6,769,231 | B2 | * | 8/2004 | Danby ..................... A21B 7/00 222/105 |
| 8,875,477 | B2 | * | 11/2014 | Rivera ................. B31D 5/0082 53/433 |
| 2004/0094229 | A1 | * | 5/2004 | Danby ..................... A21B 7/00 141/114 |
| 2005/0095099 | A1 | * | 5/2005 | Gertitschke ............. B26D 5/26 414/412 |
| 2005/0266122 | A1 | * | 12/2005 | Franceschi ......... B65D 81/3216 426/77 |
| 2009/0211713 | A1 | * | 8/2009 | Binacchi ................. B65B 29/02 156/423 |
| 2011/0033277 | A1 | * | 2/2011 | Barosio ................. A21C 9/086 414/795.6 |

FOREIGN PATENT DOCUMENTS

| | | | |
|---|---|---|---|
| WO | WO 2004071899 A1 | * 8/2004 | ......... B65D 81/3216 |
| WO | WO 2008129350 A1 | * 10/2008 | ............ B65B 9/042 |
| WO | 2010/007633 A1 | 1/2010 | |
| WO | 2011/039711 A1 | 4/2011 | |

\* cited by examiner

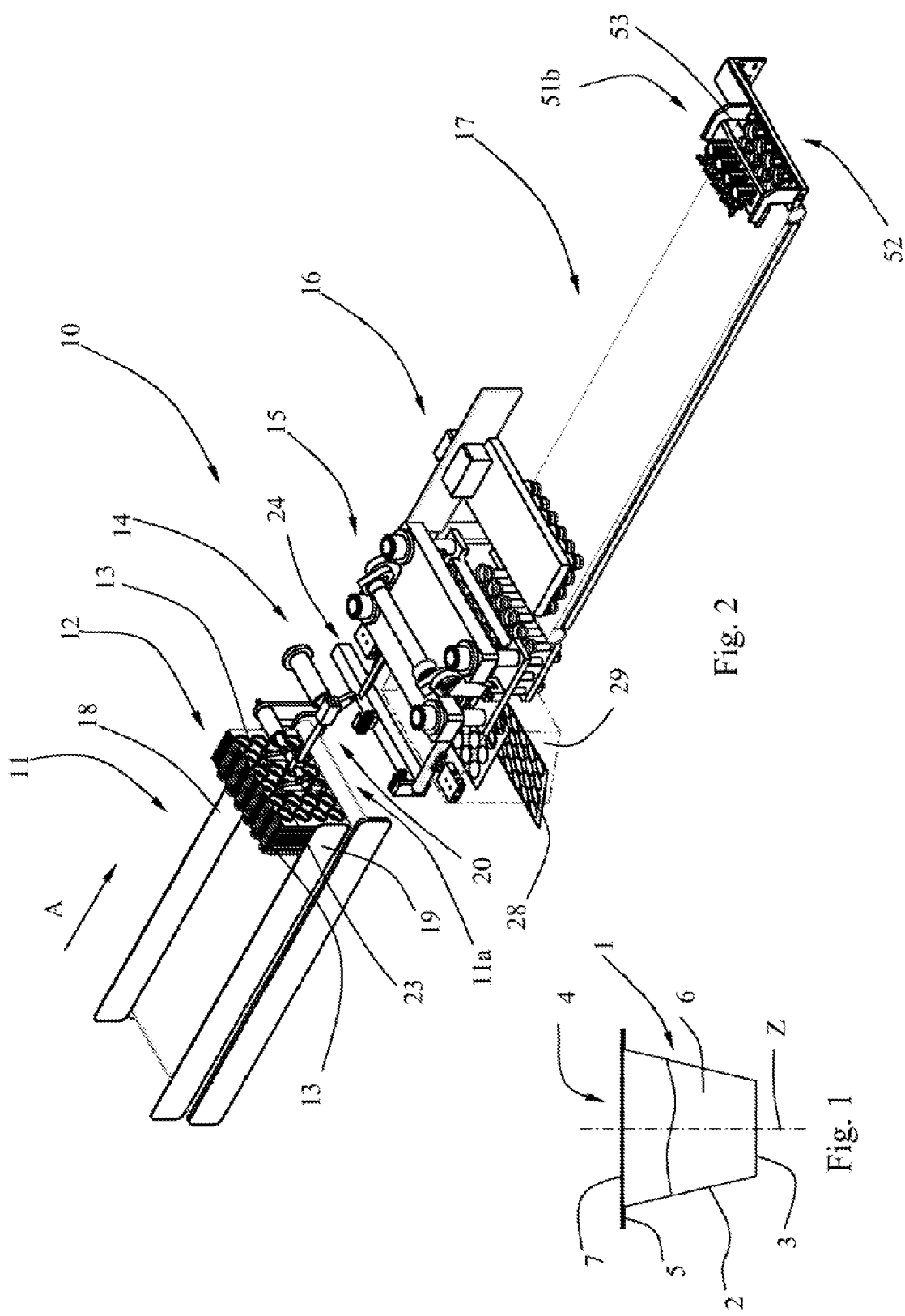

APPARATUS AND METHOD FOR FEEDING EMPTY CAPSULES TO A PACKAGING MACHINE

FIELD OF THE INVENTION

The present invention relates to an apparatus and a method for feeding containers, in particular empty capsules for single use, single portion capsules for beverages, to a packaging machine.

BACKGROUND OF THE INVENTION

In the prior art, the single use, single portion capsules for beverages, for example for extraction or infusion beverages, are produced starting from empty capsules, suitably filled with a dose of product and closed by a lid in packaging machines.

As an example, the single use capsules referred to include, in a minimum configuration:
- a rigid body, cup-shaped, (usually, but not limiting, with troncoconical shape) with a pierceable (or pre-pierced) bottom and an upper aperture provided with an external rim;
- a dose of extraction of infusion product contained in the rigid body; and
- a closing lid, pre-pierced or destined to be pierced by a nozzle feeding liquid under pressure, for closing the upper aperture of the rigid body.

The rigid body defines the empty capsule.

As a further example, the single use capsules referred to can comprise one or more filtering elements, of the rigid or flexible type, or distributing elements for distributing the liquid under pressure and/or the beverage so obtained.

In the known packaging machines, the empty capsules are usually housed in suitable seats of a transport system, for example of the multi-line type, that moves the capsules through a plurality of operative stations where the capsule is packaged.

According to a first solution, it is known to feed the empty capsules by means of one or more magazines, in particular one magazine for each line of the multi-line transport system, where the empty capsules are housed in a stack one over the other. The empty capsules arrive stacked within boxes directly from a manufacturer of empty capsules, extracted in stack from the boxes by an operator and inserted within the magazines in order to be fed to the seats of the transport system of the packaging machine.

Such solution has the advantage of being quite simple and economical, in particular for packaging machines with limited productivity, but presents drawbacks when the productivity of the packaging machine increases. Indeed, in packaging machines with high productivity, there is required to provide the magazines with an increasing number of empty capsules per time unit and the operator may not be able to keep up with the machine, with a consequent drop in productivity. In other words, a single stack of empty capsules fed by the operator to the magazine can be processed by the packaging machine in a time interval which is shorter than the time needed by the operator to load a subsequent stack of empty capsules within the magazine.

According to a second solution, it is also known to feed the empty capsules to the packaging machine through an additional machine, namely a sorter machine. The empty capsules are packed by the manufacturer of empty capsules in boxes where the empty capsules are randomly arranged, or orderly arranged in stacks. The contents of such boxes are then turned over within the sorter machine, which therefore receives the empty capsules randomly, arranges such empty capsules in order and feeds such empty capsules in order to the packaging machine. It is to be noted that the sorter machines usually need to receive the empty capsules randomly, because such sorter machines are not always able to extract, in an effective manner, the empty capsules that are stacked one into the other.

Such second solution presents some drawbacks: the sorter machine features particularly high costs and encumbrances, that rise exponentially with the productivity of the packaging machine and therefore with the number of empty capsules that have to be ordered. Furthermore, with the increase of productivity, the empty capsules in the sorter machines undergo high sort speeds, that often determine mechanical stresses and damages to the same capsules. Moreover, the boxes that contain the empty capsules randomly have a filling coefficient which is extremely low, with a consequent increase in carriage costs.

Such a solution is particularly disadvantageous, especially considering that the manufacturer of the empty capsules usually has the opportunity to orderly produce the empty capsules, i.e. in stacks.

SUMMARY OF THE INVENTION

An object of the present invention is to provide an apparatus and a method for packaging containers, in particular single use, single portion capsules for beverages, for example for extraction or infusion beverages, that overcame the disadvantages of the prior art.

In particular, it is an object of the present invention to provide an apparatus and a method that allow to feed a high number of empty capsules per time unit to a packaging machine in a simple manner, with reduced costs and limited needs for technical interventions by an operator.

The above objects are achieved by an apparatus according to claim 1 and by a method according to claim 9.

In a first aspect, the invention provides a feeding apparatus for feeding empty capsules including a magazine for a stack of trays of empty capsules, a drawing and moving device for drawing and moving one tray at the time, a separation device adapted to receive the tray from the drawing and moving device and to obtain single empty capsules, and a transfer system adapted to transfer the empty capsules from the separation device to a transport system of a packaging machine.

In a second aspect, the invention provides a method for feeding single empty capsules to a packaging machine adapted to package single use, single portion capsules for infusion or extraction beverages, that includes the steps of arranging trays of empty capsules in a stack, drawing a tray from the stack and moving the tray from the stack to a separation device, separating from the tray single empty capsules and transferring the single empty capsules to a transport system of a packaging machine.

BRIEF DESCRIPTION OF THE FIGURES

The invention will now be described with reference to the drawings, given for illustrative and not limiting purpose, wherein:

FIG. 1 is a schematic, cross section side view of an example of single use, single portion capsule for extraction or infusion beverages;

FIG. 2 is a schematic and simplified isometric view of an apparatus according to a first embodiment of the invention;

DETAILED DESCRIPTION OF THE INVENTION

Figure 3:
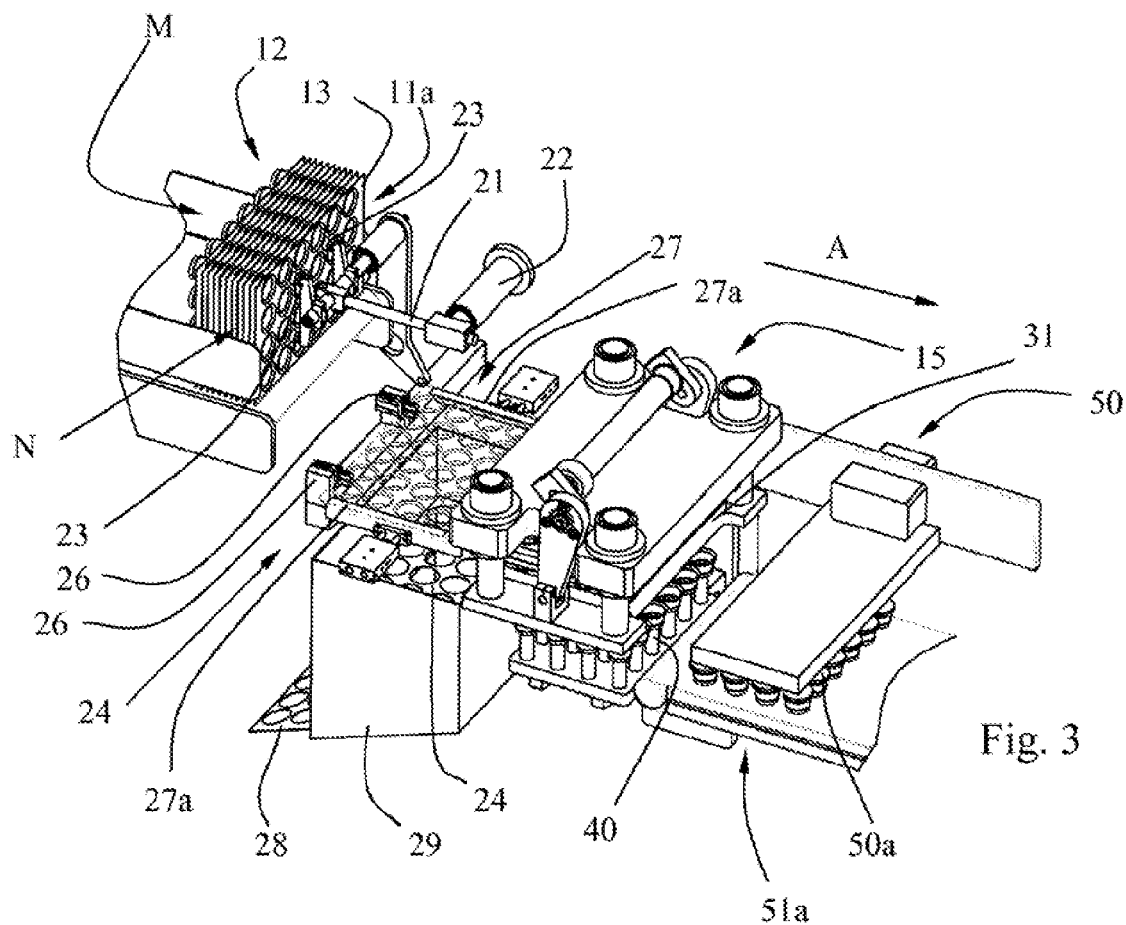
FIG. 3 is a schematic and simplified isometric view of an enlarged detail of the apparatus of FIG. 2.
Figure 4:
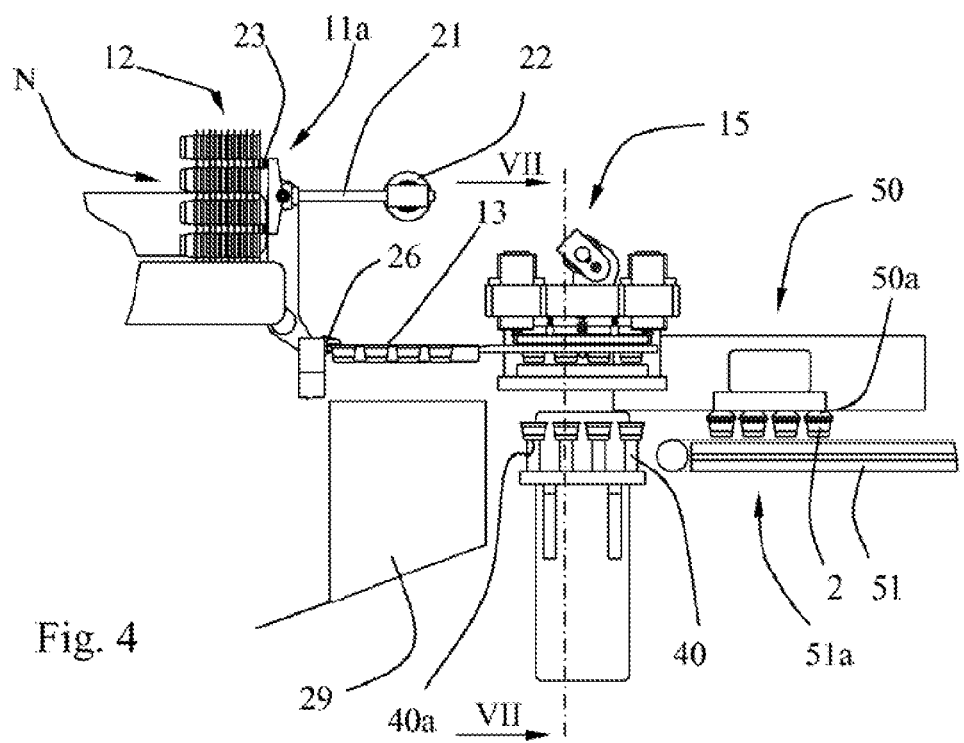
FIG. 4 is a schematic and simplified side view of the apparatus of FIG. 2.

In FIG. 1 there is illustrated an example of single use, single portion capsule 1 for extraction or infusion beverages that can be packaged with an apparatus and a method according to the invention.

The capsule 1, in a minimum configuration, includes a rigid body 2 that defines a longitudinal axis Z of the capsule 1. The rigid body 2 defines an empty capsule. The rigid body 2 presents a bottom 3 and an upper aperture 4 provided with an external rim 5. The upper aperture 4 is closed by a lid 7, joined to the external rim 5, for example by means of hot or cold gluing or sealing. The capsule 1 further includes, within the rigid body 2, a dose 6 of product, such as for example coffee, tea, milk, chocolate, or blends thereof. The rigid body 2 features, for example, a troncoconical shape, but there is understood that capsules with rigid body of different shape can be processed and packaged with the apparatus and method according to the invention. Equally, capsules including filtering or distributing elements, rigid or resilient (herein not illustrated for sake of simplicity), can be processed and packaged by the apparatus and method according to the invention. In other words, the empty capsules may comprise filtering or distributing elements, connected, for example sealed, to the external rim 5 of the rigid body 2.

In FIG. 2 there is schematically illustrated, with same parts cut away to better illustrate others, a feeding apparatus 10 for feeding empty capsules according to the invention.

The feeding apparatus 10 includes a magazine 11 adapted to house a stack 12 of trays 13 of empty capsules; a drawing and moving device 14 adapted to draw from the stack 12, and move, a tray 13; a shearing device 15 adapted to receive the tray 13 from the drawing and moving device 14 and shear such tray 13 to obtain a plurality of single empty capsules; and a transfer system 16 adapted to transfer such plurality of single empty capsules from the shearing device 15 to a transport system 17, for example of the multi-line type, of a packaging machine.

Figure 5:
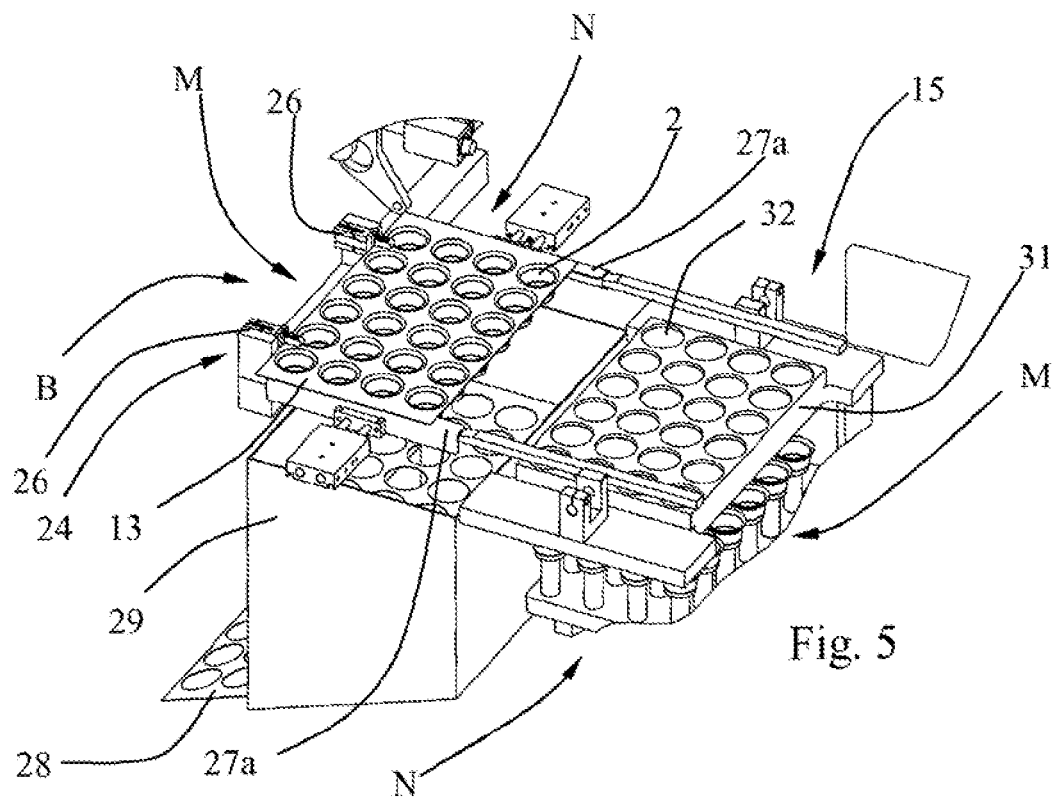
FIGS. 5 and 6 are schematic and simplified isometric views of an enlarged detail of a drawing and moving device of the apparatus of FIG. 2, with some parts cut away for sake of clarity, in a receiving position and in a delivery position, respectively.
Figure 6:
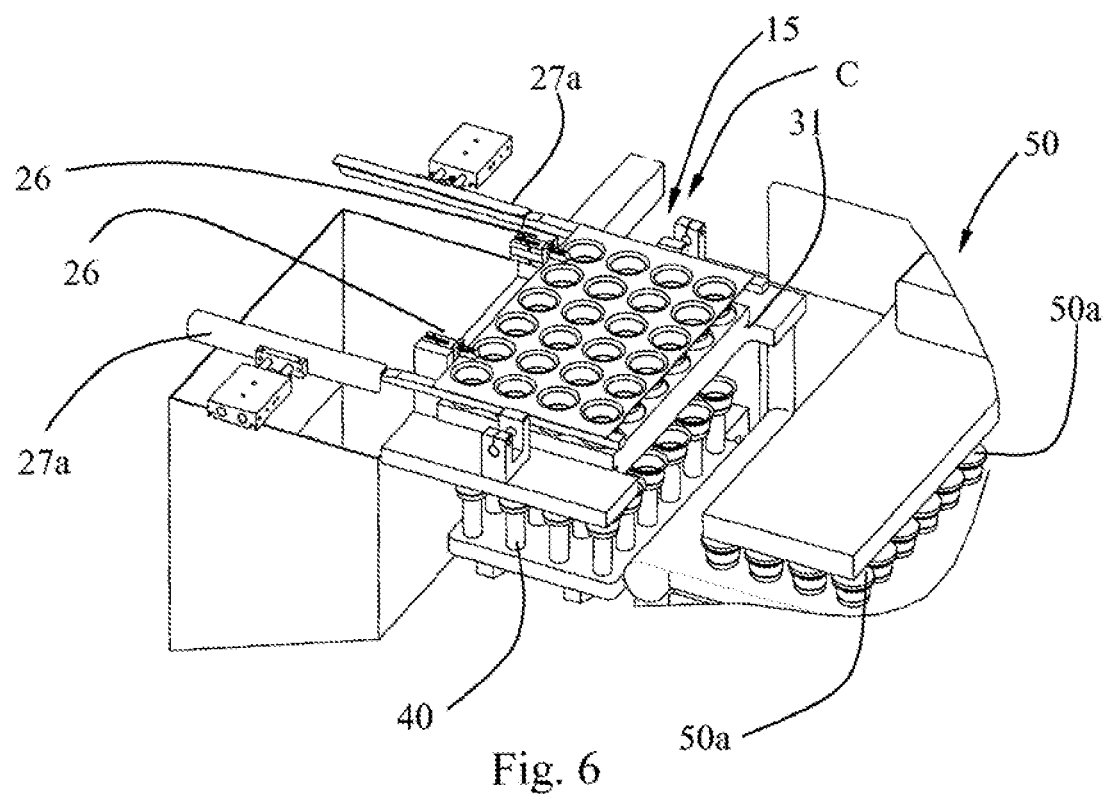

The tray 13, visible more clearly in FIGS. 5 and 6, has advantageously a rectangular shape and includes N×M empty capsules. In the illustrated embodiment, N is equal to 4 and M is equal to 6. In substance, the tray 13 includes 24 empty capsules orderly arranged in N rows and M lines. In alternative embodiments not illustrated, N and M may have values different from 4 and 6, respectively. For example, N and M may be equal to each other, so that the tray 13 be square-shaped. In general, N is advantageously comprised between 1 and 10, more advantageously between 2 and 8, further more advantageously between 4 and 6; M is advantageously comprised between 1 and 20, more advantageously between 2 and 16, further more advantageously between 4 and 12. Advantageously, M may be equal to the number of lines of a multi-line transport system of a packaging machine to be fed.

Although not illustrated, the empty capsules of the tray 13 may comprise filtering or distributing elements, sealed to the external rim 5.

The tray 13 may also be partially pre-punched, for example may be devoid of scrap edges, eliminated in previous manufacturing or processing phases. In such case, the tray 13 has a wavy contour, defined, at least partially, by the external rims 5 of the rigid bodies 2.

Furthermore, the tray 13 may include intended separation, or pre-cut, lines adapted to define the external rims 5 of the empty capsules. In such case, the shearing device 15 may be omitted and replaced by a cutting device, with blades adapted to operate at the intended separation, or pre-cut, lines, or by a pushing device adapted to detach, by breaking in correspondence of such lines, the empty capsules from the tray 13. In substance, the separation device may, depending on the type of tray 13 being processed, be a shearing device 15 of the type illustrated, or a cutting device, or a pushing device.

The trays 13 are housed according to a stack 13 in the magazine 11, within which the trays 13 slide along an advancement direction A.

The magazine 11 features an exit 11a, where, one by one, a first tray 13 presents itself in order to be drawn and moved by the drawing and moving device 14.

The stack 12 of trays 13 may be loaded within the magazine 11 manually by an operator, or automatically by mechanical devices, like robots.

The stack 12 may be pushed towards the drawing and moving device 14 by pushing devices (not illustrated), or slide by gravity.

Afterwards, known systems release one tray 13 at the time. As an example, the magazine 11 illustrated in the figures includes a pair of guides 18, 19 with retaining teeth, adapted to release one tray 13 at the time, while maintaining the stack 12 formed by the trays 13 arranged upstream blocked. The guides 18, 19 may be movable, or fixed, and the trays 13 may be extracted from the magazine exploiting the resiliency of the material which the trays are made of.

The drawing and moving device 14 includes a drawing element 20, adapted to contact and move the first tray 13 of the stack 12 towards the shearing device 15.

In the embodiment illustrated in the figures, the drawing element 20 includes an arm 21, movable in rotation about a supporting pin 22, advantageously horizontal. The arm 21 is provided with at least one contact head 23, suitably shaped to couple with the tray 13, without damaging the rigid bodies 2. Alternatively, or in addition, as in the illustrated embodiment, the contact head 23 may be provided with a suction source, for example a suction cup, to guarantee higher certainty in drawing and moving the tray 13 from the magazine 11 to the shearing device 15.

Advantageously, depending on the dimensions of the tray 13, the arm 21 may be provided with two or more contact heads 23. In the illustrated embodiment, the arm 21 is provided with four contact heads 23.

The drawing and moving device 14 further includes a moving element 24 adapted to receive from the drawing element 20, and move to the shearing device 15, the tray 13.

In the embodiment illustrated in the figures, the moving element 24 is movable stepwise in a horizontal plane, between a receiving position B, where it receives the tray 13 from the drawing element 20, and a delivery position C, in correspondence of the shearing device 15, where it delivers the tray 13 to the same shearing device 15 for being shorn.

Advantageously, the moving element 24 includes gripping elements 26 adapted to retain the tray 13 to be moved.

Advantageously, the drawing and moving device 14 includes support means 27 to support the tray 13 in movement between the receiving position B and the delivery position C.

Advantageously, the drawing and moving device 14, by means of the gripping elements 26, positively controls the tray 13 in position during the shearing operation.

Alternatively, in a not illustrated embodiment, the tray 13 is positively controlled in position by the same shearing device 15.

Once shorn in the shearing device 15 to obtain a plurality of empty capsules, a scrap 28, still retained by the gripping elements 26 of the moving element 24, remains from the tray 13. Such scrap 28 may be discharged within a container 29 placed in correspondence of the receiving position B.

For example, as in the embodiment of the figures, a first tract 27a of the support means 27, in correspondence of the receiving position B is movable between an operative, support position and a non-operative, release position, to leave the scrap 28 falling into the container 29. In detail, the transport means 27 include two linear guides on to which the trays 13 and the scraps 28 slide. First tracts 27a of the two linear guides are movable in a horizontal plane in a direction perpendicular to the advancement direction A and in mutually opposite sense. In substance, the first tracts 27a of the two linear guides move away from each other and in the non-operative, release position fail to support the scrap 28, that, consequently, falls into the container 29.

Before the drawing element 20 delivers a subsequent tray 13, the first tracts 27a of the two linear guides return in the operative, support position.

Figure 7:
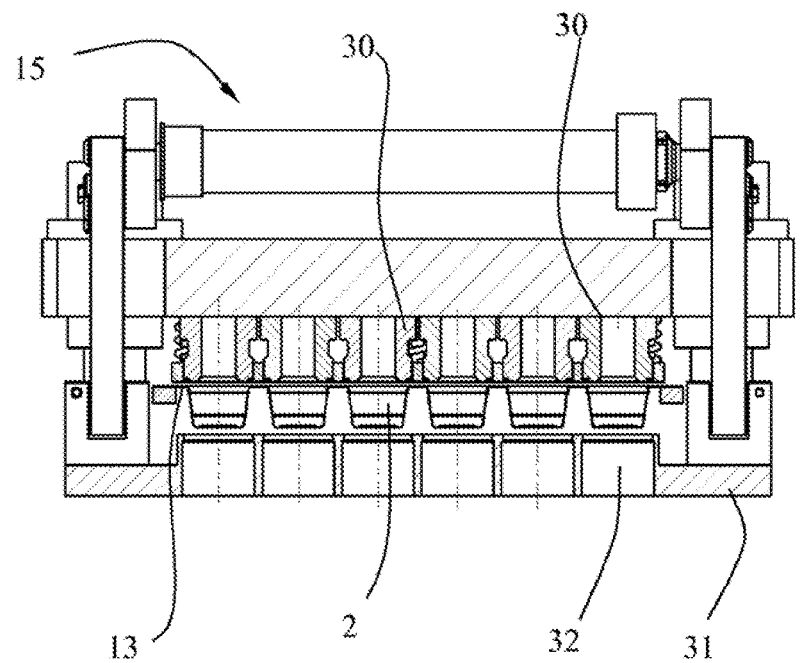
FIG. 7 is a section view along line VII-VII of FIG. 4 of a shearing device of the apparatus according to the invention.

The shearing device 15, visible in section in FIG. 7, includes a plurality of punches 30 and a die 31 including a plurality of cavities 32, adapted to couple with the punches 30 to obtain single empty capsules. In particular, the die 31 includes N×M cavities 32, so as the punches are N×M in number. Punches 30 and cavities 32 are arranged like the empty capsules in the tray 13, to shear and obtain single empty capsules.

Punches 30 and cavities 32 are thus dimensioned like the external rim 5 of the rigid bodies 2.

In the embodiment illustrated in the figures, the punches 30 are stationary, while the die 31 is vertically movable stepwise, between an operative, shearing position, where cooperates with the punches 30, and a non-operative position, far away from the punches 30.

In an alternative, non-illustrated embodiment, also the punches 30 are vertically movable stepwise, in phase with the die 31, between an operative, shearing position and a non-operative position, far away from the tray 13.

The transfer system 16 includes a plurality (N×M) of support elements 40, positioned below the shearing device 15, in particular below the punches 30 and the die 31 and each arranged in correspondence of the cavities 32 and suitably shaped to receive and support single empty capsules, separated (shorn) from the tray 13.

Advantageously, the support element 40 are provided with a suction source, for example suction cups 40a, to retain the empty capsule with more certainty.

The support elements 40 are vertically movable between an upper position, where such support elements 40 draw the empty capsules shorn from the tray 13, and a lower position.

The transfer system 13 further includes a transfer device 50 adapted to take delivery of the empty capsules from the support elements 40 arranged in the lower position and transfer them to a transport device, for example a conveyor belt 51. In detail, the transfer device 50 includes a plurality of transfer element 50a, adapted to receive from the support elements 40, retain and deliver to the transport device, the empty capsules. The transfer elements 50a are N×M in number and are arranged like the support elements 40. Advantageously, the transfer elements 50a may include suction ends, for example suction cups, to retain and move the empty capsules with more certainty.

The transfer device 50 delivers the empty capsules in correspondence of an entrance 51a of the conveyor belt 51. Advantageously, the conveyor belt 51 is movable in a horizontal plane.

The transfer device 16 further includes an aligning and block device 52 to align and block the empty capsules. The aligning and block device 52, that is coupled with the conveyor belt 51 in correspondence of an end 51b, opposite to the entrance 51a, includes a plurality of guides and a gate element 53. The guides are arranged according to the advancement direction A to guide the empty capsules according to parallel lines, for example to create a number of parallel lines equal to the number of lines of the multi-line transport system of the packaging machine. The gate element 53 is adapted to block the lines of empty capsules and to release the capsules of each line one by one to the packaging machine, in particular to suitable feeding devices of the transport system of the packaging machine, for example gripping robots (not illustrated) of the pick-and-place type. In case the transport system of the packaging machine is of the single line type, the aligning and block device 52 includes a pair of guides, funnel-shaped to create a single line of empty capsules.

The transfer system 16 enables to feed any type of transport system of the packaging machine starting from trays that feature any longitudinal pitch between an empty capsule and a subsequent one along the advancement direction, and any transversal pitch between an empty capsule and an adjacent one along a direction perpendicular to the advancement direction.

Figure 8:
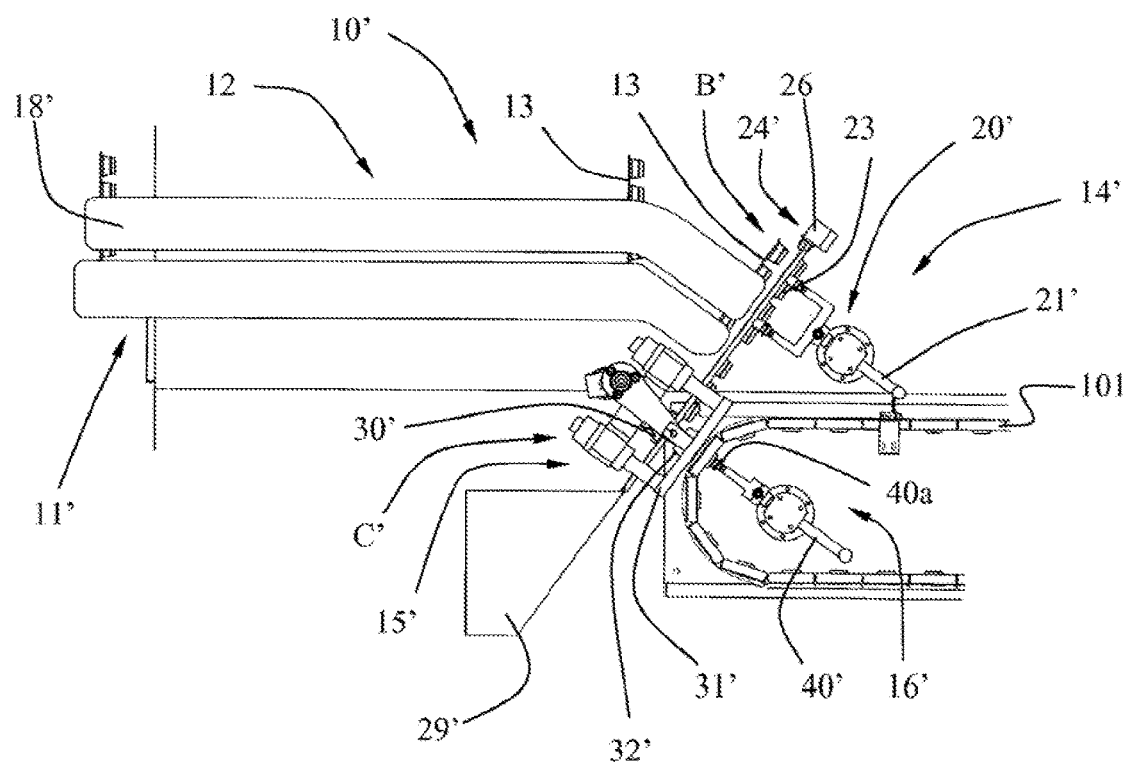
FIG. 8 is a schematic and simplified cross section view of an apparatus according to a second embodiment of the invention.

In FIG. 8 there is schematically illustrated a second embodiment of the invention. In particular, there is illustrated a feeding apparatus 10' that results simpler and more compact than the feeding apparatus 10 of FIG. 2-6, in particular as far as the transfer system 16 is concerned.

In detail, the feeding apparatus 10' includes a magazine 11' adapted to house a stack of trays 13 (many trays 13 of the stack 12 are omitted for sake of simplicity); a drawing and moving device 14' adapted to draw from the stack 12, and move, a tray 13; a shearing device 15' adapted to receive the tray 13 from the drawing and moving device 14' and shear such tray 13 to obtain a plurality of single empty capsules; and a transfer system 16' adapted to transfer such plurality of single empty capsules from the shearing device 15' to a transport system 101, for example of the multi-line type, of a packaging machine.

Below the shearing device 15', a container 29' may be advantageously positioned to collect scraps from the shearing device 15'.

The magazine 11' includes guides 18' that operate analogously to the guides 18, 19 of the magazine 11 of FIG. 2 to release one tray 13 at the time.

The drawing and moving device 14' includes a drawing element 20' adapted to contact and extract a first tray 13 from the stack 12, and a moving element 24' adapted to take delivery from the drawing element 20' of, and transfer to the shearing device 15', the first tray 13.

In the embodiment illustrated in FIG. 8, the drawing element 20' includes an arm 21', linearly movable along its own longitudinal axis. The arm 21' is provided with at least one contact head 23 suitably shaped to couple, and extract, the first tray 13, without damaging the rigid bodies 2. Advantageously, the arm 21' may be provided with two or more contact head 23, each provided with a suction source.

The moving element 24' is linearly movable between a receiving position B' where receives the tray 13 from the drawing element 20' and a delivery position C', in correspondence of the shearing device 15', where delivers the tray 13 to the same shearing device 15 to be shorn. The moving element 24' includes one or more gripping elements 26 adapted to retain the tray 13 in movement between the receiving position B' and the delivery position C'.

The shearing device 15' includes a plurality of punches 30' linearly arranged, along a single row, perpendicularly to the advancement direction A, and a die 31' including a plurality of cavities 32', adapted to couple with the punches 30' and therefore also arranged along a single row, perpendicularly to the advancement direction A. The shearing device 15' shears a single row of empty capsules at the time. As a row of empty capsules has been shorn, the moving element 24' moves the tray 13 so as a subsequent row of capsules can be shorn. As all of the N rows of the tray 13 have been shorn, the scrap falls into the containers 29' and the moving element 24' returns in the receiving position B' to receive a subsequent tray 13.

As in the shearing device 15 of FIG. 2, the punches 30' are stationary, while the die 31' is linearly movable stepwise. In alternative, non-illustrated embodiments, also the punches 30' may be movable stepwise, in phase with the die 31', or with the die 31' stationary.

Also the shearing device 15' may be replaced by analogous separation devices, such as cutting devices or pushing devices, in case the trays 13 include intended separation, or pre-cut lines.

Figure 8A:
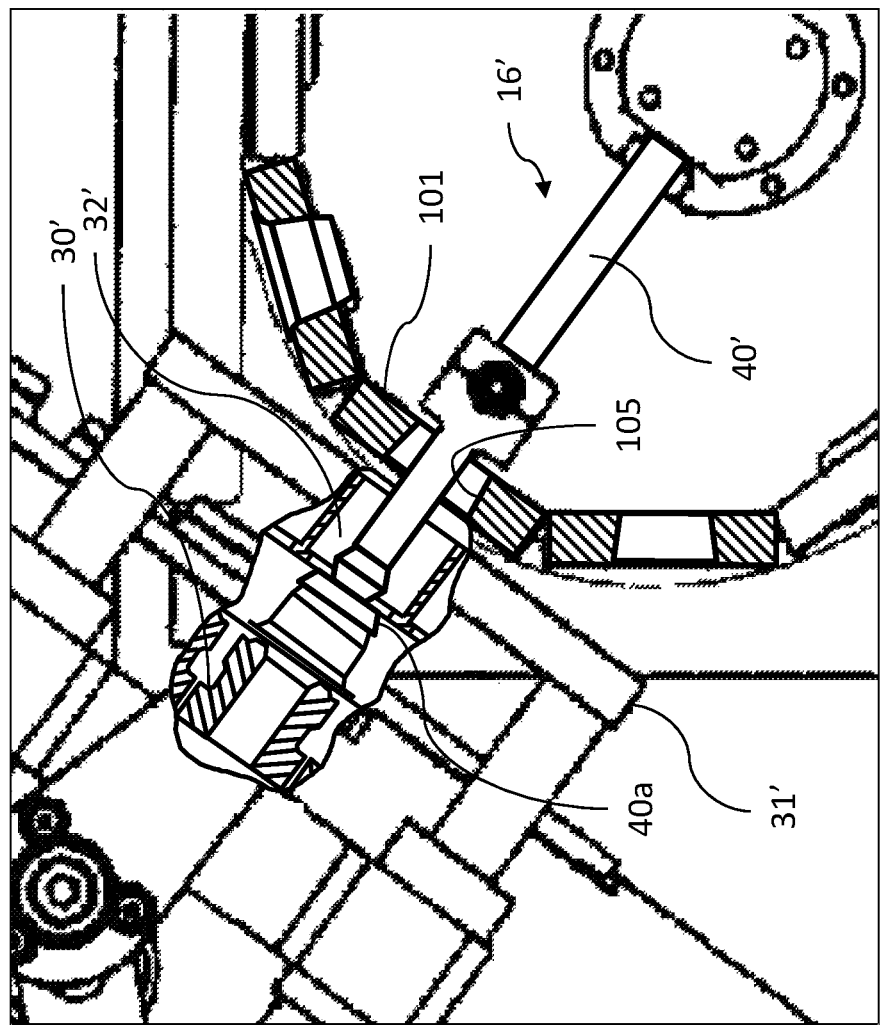
FIG. 8A is a partial cutaway schematic and simplified cross section view of the apparatus of FIG. 8, showing a support element that has been moved to pass through a seat of the transport system.

Opposite to the shearing device 15' with respect to the transport system 101 of the packaging machine, there is arranged the transfer system 16'. As shown in FIGS. 8 and 8A, the transfer system 16' includes a plurality of support elements 40', adapted to slide within respective seats 105 of the transport system 101 of the packaging machine, to draw the empty capsules in the respective seats. In detail, the support element 40' are linearly movable along their longitudinal axes, between a drawing position shown in FIG. 8A, in which the support element 40' pass through the seats of the transport system 101 and draw the empty capsules, and a deposit position shown in FIG. 8, in which the support element 40' deposit the empty capsules in the seats of the transport system 101.

The support elements 40' are advantageously provided with suction cups 40*a*.

The transfer system 16' is adapted to draw and deposit a single row of empty capsules at the time. The trays 13, the shearing device 15' and the transfer device 16' are therefore dimensioned to present a transversal pitch that is equal to the transversal pitch of the lines of the transport system 101. As the shearing device 15' shears a single row of empty capsules at the time, so as the transfer device 16' draws and deposits a single row of empty capsules at the time, the longitudinal pitch of the empty capsules in the tray 13 is irrelevant, or, in other words, may be different from the longitudinal pitch of the seats of the transport system 101.

In alternative, non-illustrated embodiments, the feeding apparatus can be arranged with respect to the transport system 101 of the packaging machine in a position different from that illustrated in FIG. 8, for example can be positioned in correspondence of a plane tract of the transport system 101. In such alternative embodiment, in the particular case in which the empty capsules in the tray 13 present the same transversal and longitudinal pitch of the seats of the transport system 101, it is possible to arrange the shearing device and the transfer system to shear and transfer more than one row of empty capsules at the time, i.e. at each machine step, so increasing the productivity of the feeding apparatus.

The invention further provides a method for feeding empty capsules to a packaging machine.

The method according to the invention provides for arranging trays 13 including a plurality of empty capsules in a stack 12, for example within a magazine 11. The trays 13 may present a rectangular shape, as illustrated in the figures, and include a plurality of empty capsules orderly arranged, for example in rows (in number of N) and lines (in number of M). It is understood that the method according to the invention can also be carried out with trays 13 with shape and arrangement of the empty capsules different from those illustrated.

The method further provides for drawing from the stack 12 a tray 13 and moving such tray 13 from the stack 12 to a separation device 12; separating from the tray 13 single empty capsules; and transferring the single empty capsules from the separating device to a transport system of the packaging machine.

In case the transport system of the packaging machine is of the multi-line type, it is advantageous, when transferring the empty capsules, to align such empty capsules in a number of lines equal to the number of lines of the multi-line transfer system.

On the contrary, if the transport system of the packaging machine is of the single-line type, it is advantageous, when transferring the empty capsules, to convey such empty capsules along a single line.

It is clear from what above described, that the apparatus and method for packaging according to the invention achieve several advantages. If M is the number of lines of the multi-line transport system, the apparatus and method according to the invention achieve a reduction by a factor M of the magazines filled with stacks of single empty capsules necessary to feed the packaging machine; in other words, it is sufficient to feed one single magazine of trays 13 and not M magazines of stacks of single empty capsules. Furthermore, if N is the number of rows of empty capsules present in the tray 13, the apparatus and method according to the invention allow for a reduction by a factor N of the frequency of replenishment of the magazine 11 with respect to the known magazines filled with stacks of single empty capsules; in other words, the magazine 11 can be replenished N times less often than the magazine fed with a stack of empty capsules.

The invention claimed is:

1. Feeding apparatus for feeding single empty capsules to a packaging machine adapted to package single use capsules for infusion or extraction beverages, the single use capsules including a rigid body with a bottom and an upper aperture provided with an external rim, the rigid body defining the empty capsules, the feeding apparatus including:
    a magazine adapted to house a stack of trays including a plurality of empty capsules;

a drawing and moving device adapted to draw from the stack, and move, a tray;

a separation device adapted to receive the tray from the drawing and moving device and obtain the plurality of empty capsules; and a transfer system adapted to transfer the plurality of empty capsules from the separation device to a transport system of the packaging machine;

the drawing and moving device including a moving element, adapted to receive the tray, grip the tray with gripping elements and move the tray to the separation device, wherein the moving element moves with reciprocating motion between a receiving position, in which the moving element receives the tray, and a delivery position in correspondence with a shearing device of the separation device, in which the moving element delivers the tray to the separation device;

the gripping elements being adapted to retain a scrap portion of the tray after the separation device obtains the plurality of empty capsules and further being adapted to discharge the scrap portion into a container.

2. Feeding apparatus according to claim 1, wherein the shearing device comprises a plurality of punches and a die including a plurality of cavities adapted to cooperate with corresponding punches to obtain the plurality of empty capsules.

3. Feeding apparatus according to claim 2, wherein the punches and the cavities are orderly arranged in rows and lines.

4. Feeding apparatus according to claim 1, wherein the drawing and moving device further includes a drawing element comprising an arm with a contact head, adapted to contact a tray of the stack, the drawing element further comprising a supporting pin, the arm and contact head being moveable in rotation about the supporting pin, wherein the moving element is further adapted to receive the tray from the drawing element.

5. Feeding apparatus according to claim 1, wherein the transfer system includes a plurality of support elements arranged below the separation device, a plurality of transfer elements, and a transport device, the transfer elements being adapted to receive from the support elements, retain and deposit on to the transport device, the empty capsules.

6. Feeding apparatus according to claim 5, wherein the transfer system includes a plurality of guides, arranged along an advancing direction to guide the empty capsules along parallel lines, and a gate element, adapted to block the lines of empty capsules and release one empty capsule at a time per line to the packaging machine.

7. Feeding apparatus according to claim 1, wherein the transfer system is arranged opposite to the shearing device with respect to the transport system and includes a plurality of support elements, adapted to draw the empty capsules separated by the separation device and deposit the empty capsules in the transport system.

8. Feeding apparatus according to claim 1, wherein the gripping elements are adapted to discharge the scrap portion into the container in correspondence with the receiving position.

9. Method for feeding empty capsules to a packaging machine adapted to package single use capsules for infusion or extraction beverages, the capsules including a rigid body with a bottom and an upper aperture provided with an external rim, the rigid body defining the empty capsules, the method including the steps of:

arranging trays of empty capsules in a stack, the trays including a plurality of empty capsules;

drawing a tray from the stack and moving the tray from the stack to a separation device, wherein moving the tray from the stack to the separation device comprises gripping the tray with gripping elements and reciprocating the gripping elements between a receiving position, in which the gripping elements receive the tray, and a delivery position in correspondence with a shearing device of the separation device, in which the gripping elements deliver the tray to the separation device;

separating from the tray a plurality of single empty capsules;

retaining a scrap portion of the tray in the gripping elements after separating the plurality of single empty capsules from the tray;

discharging the scrap portion from the gripping elements into a container; and transferring the plurality of single empty capsules from the separation device to a transport system of the packaging machine.

10. Method according to claim 9, wherein the step of arranging trays of empty capsules provides for arranging trays including a plurality of empty capsules, orderly arranged in rows and lines.

11. Method according to claim 9, wherein the step of separating includes a step of shearing.

12. Method according to claim 9, wherein the step of transferring includes a step of aligning empty capsules in a number of lines equal to a number of lines of the transport system of the packaging machine.

13. Method according to claim 9, wherein discharging the scrap portion from the gripping elements into the container further comprises discharging the scrap portion into the container in correspondence with the receiving position.

* * * * *